(12) United States Patent
Harada et al.

(10) Patent No.: US 11,243,335 B2
(45) Date of Patent: Feb. 8, 2022

(54) OPTICAL FILM, AND OPTICAL BARRIER FILM, COLOR CONVERSION FILM AND BACKLIGHT UNIT EACH USING THE SAME

(71) Applicant: TOPPAN PRINTING CO., LTD., Tokyo (JP)

(72) Inventors: Genki Harada, Tokyo (JP); Hayato Ida, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 274 days.

(21) Appl. No.: 15/587,043

(22) Filed: May 4, 2017

(65) Prior Publication Data

US 2017/0235025 A1     Aug. 17, 2017

Related U.S. Application Data

(63) Continuation of application No. PCT/JP2015/081637, filed on Nov. 10, 2015.

(30) Foreign Application Priority Data

Nov. 14, 2014  (JP) .............................. JP2014-231621

(51) Int. Cl.
*B32B 7/02* (2019.01)
*G02B 1/14* (2015.01)
(Continued)

(52) U.S. Cl.
CPC .................. *G02B 1/14* (2015.01); *B32B 7/02* (2013.01); *B32B 9/00* (2013.01); *F21V 9/30* (2018.02);
(Continued)

(58) Field of Classification Search
CPC .... F21V 9/30; G02B 1/14; G02B 1/16; G02B 6/005; G02B 5/0226; G02B 5/0278; G02B 5/0294; G02F 1/133606; G02F 1/133614

See application file for complete search history.

(56) References Cited

U.S. PATENT DOCUMENTS 4,623,589 A    11/1986  Simmonds, Jr.
5,312,671 A *   5/1994  Atherton ................... G03F 1/68
                                                428/143
(Continued)

FOREIGN PATENT DOCUMENTS

CN    101265334 A    9/2008
CN    102565893 A    7/2012
(Continued)

OTHER PUBLICATIONS

Yoshida et al, "English Translation of JP2007256802A," EPO (Year: 2007).*

(Continued)

*Primary Examiner* — Maria V Ewald
*Assistant Examiner* — Ethan Weydemeyer
(74) *Attorney, Agent, or Firm* — Foley & Lardner LLP (57) ABSTRACT

An optical film comprises a first transparent film substrate, a matte layer arranged on the first transparent film substrate and having irregularities, the matte layer having a coefficient of static friction of not larger than 0.3 and a maximum height roughness Rz of not less than 0.05 μm to not larger than 8 μm.

14 Claims, 5 Drawing Sheets

(51) Int. Cl.
   *F21V 9/30*      (2018.01)
   *B32B 9/00*      (2006.01)
   *G02B 1/16*      (2015.01)
   *F21V 8/00*      (2006.01)
   *G02B 5/02*      (2006.01)
   *G02F 1/13357*   (2006.01)
   *G02F 1/1335*    (2006.01)

(52) U.S. Cl.
   CPC ............... *G02B 1/16* (2015.01); *G02B 6/005* (2013.01); *G02B 5/0226* (2013.01); *G02B 5/0278* (2013.01); *G02B 5/0294* (2013.01); *G02F 1/133606* (2013.01); *G02F 1/133614* (2021.01)

(56) References Cited

U.S. PATENT DOCUMENTS

| | | |
|---|---|---|
| 2008/0226888 A1 | 9/2008 | Kawanishi et al. |
| 2011/0183110 A1 | 7/2011 | Yamazaki et al. |
| 2012/0258295 A1 | 10/2012 | Leyder et al. |
| 2014/0056024 A1 | 2/2014 | Kim et al. |
| 2014/0106131 A1 | 4/2014 | Ikai et al. |
| 2015/0126659 A1 | 5/2015 | Pokorny et al. |
| 2015/0203718 A1 | 7/2015 | Hosoda et al. |

FOREIGN PATENT DOCUMENTS

| | | |
|---|---|---|
| CN | 103197363 A | 7/2013 |
| EP | 2 700 998 A1 | 2/2014 |
| JP | 2003-270410 A | 9/2003 |
| JP | 2004-198707 A | 7/2004 |
| JP | 2006-049657 A | 2/2006 |
| JP | 3790571 B2 | 6/2006 |
| JP | 2007-011317 A | 1/2007 |
| JP | 2007-256802 A | 10/2007 |
| JP | 4227436 | 2/2009 |
| JP | 2009-173722 A | 8/2009 |
| JP | 2009-231273 A | 10/2009 |
| JP | 2010-164690 A | 7/2010 |
| JP | 2010-528118 A | 8/2010 |
| JP | 2012-108438 A | 6/2012 |
| JP | 2013-189562 A | 9/2013 |
| JP | 5323709 B2 | 10/2013 |
| JP | 2013-544018 A | 12/2013 |
| JP | 2014-040572 A | 3/2014 |
| JP | 2014-069554 A | 4/2014 |
| JP | 2014-145902 A | 8/2014 |
| JP | 2014-159124 A | 9/2014 |
| KR | 20100102290 A | 9/2010 |
| WO | WO-2009/031598 A1 | 3/2009 |

OTHER PUBLICATIONS

Shimizu et al, "English Translation of JP2014145902A," EPO (Year: 2014).*
Cha et al, "English Translation of JP2014040572A," EPO (Year: 2014).*
Extended European Search Report dated Jun. 12, 2018 in corresponding application No. 15858840.0.
International Search Report for International Patent Application No. PCT/JP2015/081637 dated Feb. 16, 2016.
Chinese Office Action for corresponding App. No. 201680017334.7 dated Jul. 22, 2019.
Database WPI XP002782884.
Database WPI XP002782885.
Extended European Search Report dated Jul. 17, 2018 in corresponding application No. 16772076.2.
International Search Report Issued in International Patent Application No. PCT/JP2016/056648 dated May 24, 2016.
Taiwanese Office Action dated Oct. 28, 2019 for corresponding Application No. 105109961.

* cited by examiner

OPTICAL FILM, AND OPTICAL BARRIER FILM, COLOR CONVERSION FILM AND BACKLIGHT UNIT EACH USING THE SAME

CROSS-REFERENCE TO RELATED PATENT APPLICATIONS

This application is a continuation application filed under 35 U.S.C. § 111(a) claiming the benefit under 35 U.S.C §§ 120 and 365(c) of International Application No. PCT/JP2015/081637, filed on Nov. 10, 2015, which is based upon and claims the benefit of priority of Japanese Patent Application No. 2014-231621, filed on Nov. 14, 2014, the entities of which are hereby incorporated by reference.

TECHNICAL FIELD

This invention relates to an optical film, and an optical barrier film, a color conversion film, and a backlight unit, each using the same.

BACKGROUND

Liquid crystal displays are those devices displaying images by transmitting or interrupting light based on the application of voltage. A liquid crystal display needs an external light source, for which a backlight using light-emitting diodes has been used as a light source for liquid crystal displays.

With the backlight using light-emitting diodes, there has been attempted a method of synthesizing white light by using of diodes of three colors including red, green and blue, or a method of converting blue light into white light through a color conversion material. With the method using a color conversion material, white light converted, for example, with a YAG phosphor has a wide emission spectrum and is thus poor in matching with a color filter for liquid crystal display, with the result that the color reproduction region of the liquid crystal display becomes narrow. The conversion to white light with the aid of the YAG phosphor requires high power consumption.

In this connection, however, when using core-shell light-emitting nanocrystals as a color conversion material even in the method of using a color conversion material, blue light is converted into white light consisting of a sharp emission spectrum of red, green and blue. Accordingly, the color reproduction region of the liquid crystal display is enlarged, and the power consumption for the conversion into white light can be reduced (e.g. see Patent Literature 1). The core-shell light-emitting nanocrystals can be assembled, for example, into a backlight unit for use as a color conversion film after mixing with a binder resin.

When undergoing oxidation with air and moisture, the core-shell light-emitting nanocrystals are deteriorated in color conversion performance. Therefore, it is necessary to provide a barrier layer for protecting the color conversion film from air and moisture. In the case where a color conversion film made of the core-shell light-emitting nanocrystals is assembled into a backlight unit, there is some concern with respect to the blocking (or sticking) of the color conversion film with other member in contact therewith. To avoid this, the backlight unit is provided with a light diffusion sheet (matte layer) having irregularities (e.g. see Patent Literatures 2 to 4).

CITATION LIST

Patent Literature

[PTL1] JP-T-2010-528118
[PTL2] JP Patent Publication No. 3790571
[PTL3] JP Patent Publication No. 5323709
[PTL4] JP-A-2003-270410

SUMMARY OF THE INVENTION

Technical Problem

When a matte layer having irregularities for suppressing blocking and a facing member are superposed on each other, there have been some cases that the surfaces of the matte layer and the other facing member are scratched. Moreover, when a plurality of color conversion films including a matte layer having such irregularities are transported as stacked, there has been the possibility that the matte layer and the like are scratched on the surfaces thereof. Further, if foreign matters such as dust are present on the matte layer in the course of the production step of a backlight unit, scratches have been occasionally found on the surface such as of the matte layer. When the surfaces of the matte layer and other member facing thereto are scratched, the display performance of a display lowers.

The present invention has for its object the provision of an optical film having a matte layer wherein not only blocking of the matte layer with other member facing therewith is prevented, but also the surfaces of the matte layer and the other facing member are less likely to be scratched. Moreover, the invention has for another object the provision of an optical barrier film, a color conversion film and a backlight unit, each including the optical film and excellent in barrier properties.

Solution to Problem

The optical film according to one embodiment of the invention comprises a transparent film substrate, and a matte layer arranged on the transparent film substrate and having irregularities wherein a coefficient of static friction is not larger than 3 and a maximum height roughness Rz of the matte layer is from not less than 0.05 μm to not larger than 8 μm. According to this optical film, since the matte layer having appropriate irregularities is provided, there can be obtained improved scratch prevention in addition to anti-blocking properties. More particularly, not only blocking (sticking) with another member facing the matte layer is prevented, but also there can be obtained an optical film that is unlikely to undergo scratches on the surfaces of the matte layer and the other facing member.

In the optical film, it is preferred that the matte layer contains a binder resin and fine particles, and the average particle size of the fine particles ranges from 0.5 μm to 10 μm, inclusive. According to this optical film, since the average particle size of the fine particles is from not less than 0.5 μm to not larger than 10 μm, there can be obtained a matte layer having appropriate irregularities sufficient to provide anti-blocking properties and improved scratch prevention.

With the optical film, the matte layer should preferably contain at least one selected from the group consisting of a quaternary ammonium salt material, a conductive polymer and metal oxide particles. According to this optical film, some conductive material is added to the matte layer thereby enabling antistatic properties to be imparted to the matte layer. This leads to reduced incorporation of dust and the like into the matte layer, so that scratches generated in the surfaces of the matte layer and the like are reduced in number in the manufacturing step of a backlight unit.

With the optical film, the surface resistance of the matte layer is preferably not larger than $1.0 \times 10^{13} \Omega/\square$. According to this optical film, since the surface resistance of the matte layer is not larger than $1.0 \times 10^{13} \Omega/\square$, an appropriate antistatic performance is developed.

The optical barrier film according to an embodiment of the invention includes a barrier layer and the above-described optical film wherein the barrier layer is arranged on a surface opposite to the matte layer side of the transparent film substrate of the optical film. According to this optical barrier film, not only anti-blocking properties and improved scratch preventions are developed, but also the infiltration of air and moisture can be conveniently reduced by means of the barrier layer.

The optical barrier film related to an embodiment of the invention includes a barrier composite layer having a transparent film substrate and a barrier layer, and the optical film wherein the barrier composite layer is arranged on a surface opposite to the matter layer side of the transparent film substrate of the optical film. According to this optical barrier film, not only the anti-blocking properties and improved scratch prevention are achieved with the matte layer, but also the infiltration of air and moisture can be appropriately reduced by means of the barrier composite layer. The barrier composite layer undergoes less scratching or defects generated in the step and the infiltration of air and moisture is more reduced when compared with the barrier layer.

With the optical barrier film, the barrier layer should preferably contain a silicon oxide represented by $SiO_x$ ($1.0 \leq x \leq 2.0$). According to this optical barrier film, since the barrier layer contains a silicon oxide having an appropriate atomic ratio, its barrier properties can be maintained over a long time.

The color conversion film related to an embodiment of the invention includes a color conversion layer and two optical barrier films provided to sandwich the color conversion film therebetween wherein at least one of the optical barrier films is made of the optical barrier film defined above. According to this color conversion film, not only anti-blocking properties and improved scratch prevention are developed, but also the infiltration of air and moisture are appropriately reduced with the barrier layer, thereby enabling the color conversion performance of the color conversion film to be maintained over a long time.

The backlight unit related to an embodiment of the invention includes a light source, a light guiding plate, and a color conversion film arranged on the light guiding plate wherein the color conversion film is arranged in contact with the light guiding plate. According to this backlight unit, the light guiding plate in contact with the color conversion film can be prevented from being scratched. Since the scratching of the barrier layer itself is prevented, the infiltration of air and moisture into the color conversion layer is appropriately reduced, and good white light can be obtained from the backlight unit over a long time.

Effect of Invention

According to the present invention, there is provided an optical film having a matte layer wherein not only blocking with other member facing the matte layer is prevented, the surfaces of the matte layer and the other facing member are less likely to be scratched. According to the invention, there are also provided an optical barrier film, a color conversion film, and a backlight unit, which include the optical film and are excellent in barrier properties.

DESCRIPTION OF REPRESENTATIVE EMBODIMENTS

Preferred embodiments of the present invention are now described in detail with reference to the accompanying drawings. It will be noted that in the drawings, like or corresponding portions are designated by like reference numerals and are not repeatedly illustrated. The relation among the left, right, top and bottom positions is based on the positional relation shown in the drawings unless otherwise specified. Moreover, the dimensional ratios in the drawings are not limited to those ratios indicated therein.

(Optical Film)

Figure 1:
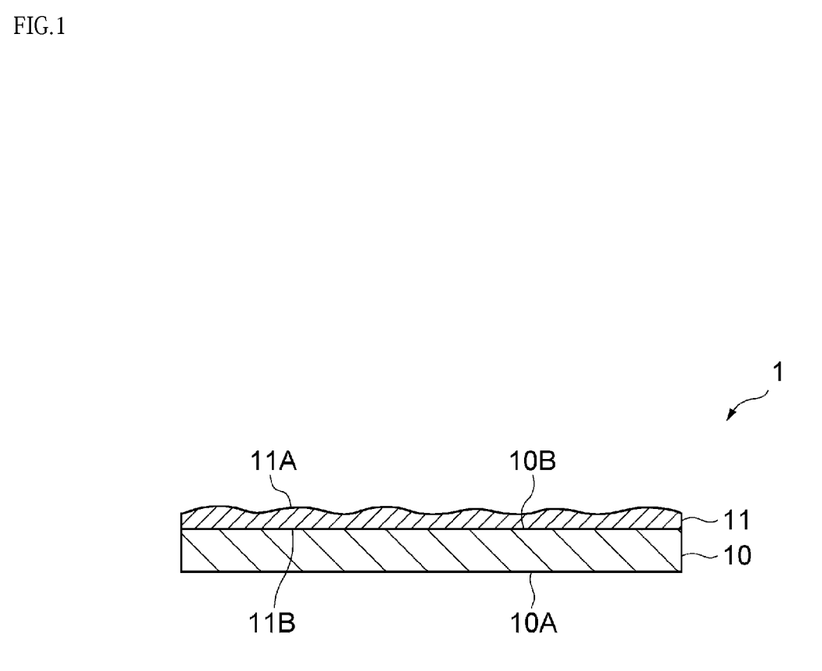
FIG. 1 is a schematic sectional view of an optical film related to an embodiment of the invention.

FIG. 1 is a schematic sectional view of an optical film related to an embodiment of the invention. An optical film 1 includes a first transparent film substrate 10 and a matte layer 11. The first transparent film substrate 10 has a first surface 10A and a second surface 10B opposite to the first surface 10A. The matte layer 11 has an uneven surface 11A having irregularities and an undersurface 11B. The undersurface 11B of the matte layer 11 and the second surface 10B of the first transparent film substrate 10 are laminated together so that the matte layer 11 is provided on the first transparent film substrate 10.

<First Transparent Film Substrate>

The first transparent film substrate 10 used in the invention can be made, for example, of an organic polymer film. More particularly, the first transparent film substrate 10 is made, for example, of organic polymers including polyolefins such as polyethylene, polypropylene and the like, polyesters such as polyethylene terephthalate, polyethylene naphthalate and the like, celluloses such as triacetyl cellulose, diacetyl cellulose, cellophane and the like, polyamides such as 6-nylon, 6,6-nylon and the like, acrylic polymers such as polymethyl methacrylate and the like, polystyrene, polyvinyl chloride, polyimides, polyvinyl alcohol, polycarbonates, ethylene-vinyl alcohol polymer and the like.

The thickness of the first transparent film substrate 10 is, for example, preferably within a range of 5 μm to 300 μm, inclusive. If the thickness of the first transparent film substrate 10 is less than 5 μm, the strength of the first transparent film substrate 10 lowers, so that difficulty is involved in handling the first transparent film substrate 10 in the step of making a backlight unit using the first transparent film substrate 10. On the other hand, if the thickness of the first transparent film substrate 10 is larger than 300 μm, some difficulty is also involved in handling the first transparent film substrate 10 in the step of film formation by a roll-to-roll method.

<Matte Layer>

A matte layer composition for making the matte layer 11 includes, for example, a binder resin and fine particles. The irregularities of the uneven surface 11A of the matte layer 11 are formed, for example, by fine particles. When the matte layer 11 is formed on the first transparent film substrate 10 and the resulting optical film 1 is used, for example, as a member for backlight unit, blocking (sticking) with other member facing the optical film 1 can be more favorably prevented. When the matte layer 11 is provided on the first transparent film substrate 10 in the optical film 1, a scratch-proofing effect on other member in face-to-face relation with the optical film 1 and also on the uneven surface 11A of the matte layer 11 can be increased. The thickness of the matte layer 11 is, for example, preferably from 0.5 μm to 30 μm, inclusive. The thickness of the matte layer 11 is measured according to the mass method in compliance with JIS K5600. When the matte layer 11 has a thickness within such a range as indicated above, the irregularities are likely to be formed in the uneven surface 11A of the matte layer 11. The irregularities of the uneven surface 11A of the matte layer 11 may be formed by embossing aside from the method using fine particles. Alternatively, the irregularities may be formed, for example, in a manner wherein a resin, such as a binder resin, is subjected to phase separation to form a sea-island structure on the matte layer 11. Where the irregularities are formed by such a method of embossing or phase separation, the matte layer 11 may or may not contain fine particles.

With the matte layer 11 used in the invention, its coefficient of static friction is not larger than 0.3. The coefficient of static friction of the matte layer 11 is preferably not larger than 0.25. If the coefficient of static friction of the matte layer 11 exceeds 0.3, the effect of preventing scratching of other member facing the optical film 1 and the uneven surface 11A of the matte layer 11 lowers. The coefficient of static friction of the matte layer 11 is adjusted, for example, by changing the type of binder resin and the type of material, the particle size and the amount of the fine particles.

With the matte layer 11 used in the present invention, the maximum height roughness Rz is from 0.05 μm to 8 μm, inclusive. The maximum height roughness Rz of the matte layer 11 is preferably not larger than 5 μm. If the maximum height roughness of the matte layer 11 is less than 0.05 μm, blocking with other member that is facing the optical film 1 is apt to occur. On the other hand, if the maximum height roughness Rz becomes larger than 8 μm, the effect of preventing scratching of other member that is facing the optical film 1 and the uneven surface 11A of the matte layer 11 lowers. The maximum height roughness Rz of the matte layer 11 is adjusted, for example, by the particle size and the amount of the fine particles.

<Binder Resin>

The binder resin can be a resin that is excellent, for example, in optical transparency. More particularly, the binder resin includes, for example, a thermoplastic resin, a thermosetting resin and an ionizing radiation-curing resin such as a polyester resin, an acrylic resin, an acrylic urethane resin, a polyester acrylate resin, a polyurethane acrylate resin, an epoxy acrylate resin, a urethane resin, an epoxy resin, a polycarbonate resin, a cellulose resin, an acetal resin, a polyethylene resin, a polystyrene resin, a polyamide resin, a polyimide resin, a melamine resin, a phenolic resin, a silicone resin or the like. A preferred binder resin includes an acrylic resin. The acrylic resin has excellent light fastness and optical characteristics.

<Fine Particles>

The fine particles include, for example, inorganic fine particles such as of silica, clay, talc, calcium carbonate, calcium sulfate, barium sulfate, aluminum silicate, titanium oxide, synthetic zeolite, alumina, smectite and the like, and organic fine particles made of a polyolefin resin such as polypropylene, a polyamide resin such as nylon, an acrylic urethane resin, a styrene resin, a urethane resin, a benzoguanamine resin, a silicone resin or an acrylic resin. The fine particles should preferably be organic fine particles and more preferably those organic fine particles of a polyolefin resin, a polyamide resin or a silicone resin. With the organic fine particles, spherical particles are likely to be obtained with the ease in shape control into a desired type of irregularities. The fine particles used may be made of one type of resin indicated above, or a combination of plural types of resins.

The average size of the fine particles is preferably from 0.5 μm to 10 μm, inclusive. If the average size is less than 0.5 μm, there is a tendency toward the likelihood of causing blocking between the matte layer 11 and other backlight unit members. On the other hand, when the average particle size exceeds 10 μm, the surface irregularities of the fine particles become great with a tendency to low the scratch prevention properties of other members. The amount of the fine particles is preferably from not less than 20 mass % to not larger than 80 mass %, more preferably from not less than 5 mass % to not larger than 50 mass %, based on the total solid content of the matte layer 11. If the amount is less than 2 mass %, there is a tendency that blocking between the matte layer 11 and other backlight unit members is apt to occur. On the other hand, when the amount exceeds 80 mass %, there is also a tendency to lower the scratch prevention properties of other members. The haze of the optical film 1 is controlled depending on the type of material, the amount and the particle size of the fine particles.

<Isocyanate Curing Agent>

An isocyanate curing agent may be added to the matte layer 11. In the case where a resin having a hydroxyl group is chosen as a binder resin, to which an isocyanate curing agent is added, the matte layer 11 can be thermally cured. The curing agent is not specifically limited in type so far as an isocyanate compound is used. Preferred agents include those capable of crosslinking with the hydroxyl group of an acrylic polyol resin and based on aliphatic isocyanates such as hexamethylene diisocyanates, xylylene diisocyanates and the like and also aromatic isocyanates such as toluene diisocyanates, diphenylmethane diisocyanates and the like.

<Conductive Material>

A conductive material may be added to the matte layer 11. When the conductive material is added, the surface resistance value of the matte layer 11 is lowered. If the surface resistance value of the matte layer 11 is not larger than $1.0 \times 10^{13} \Omega/\square$, an antistatic performance is favorably developed. As a result, the incorporation of dust and the like into the matte layer 11 is reduced, along with a reduced risk of scratching generated in the surface of the matte layer 11 in the course of the step of making a backlight unit. The conductive material includes, for example, a quaternary ammonium salt, metal oxide particles, a conductive polymer, and the like.

The quaternary ammonium salt has a structure of —$N^+X^-$. The quaternary ammonium salt has a quaternary ammonium cation ($N^+$) and an anion ($X^-$), thereby imparting electric conductivity to the matte layer 11. The anion (X⁻) of the quaternary ammonium salt can be, for example, Cl⁻, Br⁻, I⁻, F⁻, $HSO_4^-$, $SO_4^{2-}$, $NO_3^-$, $PO_4^{3-}$, $HPO_4^{2-}$, $H_2PO_4^-$, $SO_3^-$, and OH⁻. As a quaternary ammonium salt, an acrylic material having a quaternary ammonium salt as a functional group in the molecule is preferably used. This acrylic material includes, for example, a monofunctional or polyfunctional (meth) acrylate compound such as an acrylic or methacrylic ester of a polyhydric alcohol containing a quaternary ammonium salt (—N⁺X⁻) as a functional group in the molecule, or a polyfunctional urethane (meth) acrylate prepared from a diisocyanate and a hydroxy ester of a polyhydric alcohol and acrylic acid or methacrylic acid.

The metal oxide particles can be made, for example, of a material that comprises, as a main component, one or two or more metal oxides selected from zirconium oxide, antimony-containing tin oxide (ATO), phosphorus-containing tin oxide (PTO), tin-containing indium oxide, aluminum oxide, cerium oxide, zinc oxide, aluminum-containing zinc oxide, tin oxide, a lithium salt, antimony-containing zinc oxide and indium-containing zinc oxide.

The conductive polymer can be made of one or two or more mixtures selected from polyacetylene, polyaniline, polythiophene, polypyrrole, polyphenylene sulfide, poly(1, 6-heptadiine), polybiphenylene (polyparaphenylene), polyparaphenylene sulfide, polyphenylacetylene, poly(2,5-thienylene) and derivatives thereof.

It will be noted that the matte layer composition having the binder resin and fine particles described above may further comprise, aside from the conductive material, a curing agent, a photopolymerization initiator, a leveling agent, a lubricant and a solvent, for example.

<Making of the Matte Layer>

In the step of making the matte layer 11, a matte layer composition is initially coated on the first transparent film substrate 10. The coating is carried out, for example, by the use of a roll coater, a reverse roll coater, a gravure coater, a microgravure coater, a knife coater, a bar coater, a wire bar coater, a die coater and a dip coater.

After the coating of the matte layer composition on the first transparent film substrate 10, a drying treatment is carried out to remove the solvent left in the coating film of the matte layer composition. The drying treatment is carried out, for example, by heating and blasting such as of hot air.

The coating film of the matte layer composition having been subjected to the drying treatment is further subjected to a curing treatment such as a curing treatment by heating again or ionizing radiation irradiation, thereby forming a matte layer 11. The ionizing radiation can be, for example, UV light or an electron beam. The UV light is generated from a light source including, for example, a high pressure mercury lamp, a low pressure mercury lamp, a super high pressure mercury lamp, a metal halide lamp, a carbon arc, a xenon arc or the like. The electron beam is generated from a variety of electron beam accelerators such as, for example, of Cockroft Wald type, Van de Graaff type, resonance transformer type, insulated core transformer type, linear type, Dynamitron type, and high frequency type.

(Optical Barrier Film)

Figure 2A:
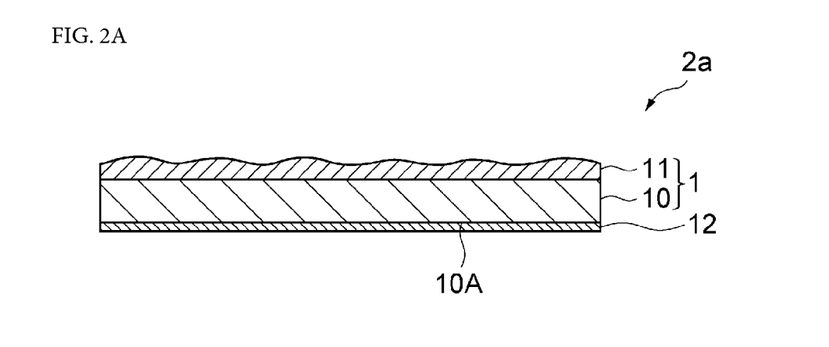
FIGS. 2A, 2B, and 2C are schematic sectional views showing an optical barrier film related to an embodiment of the invention.
Figure 2B:
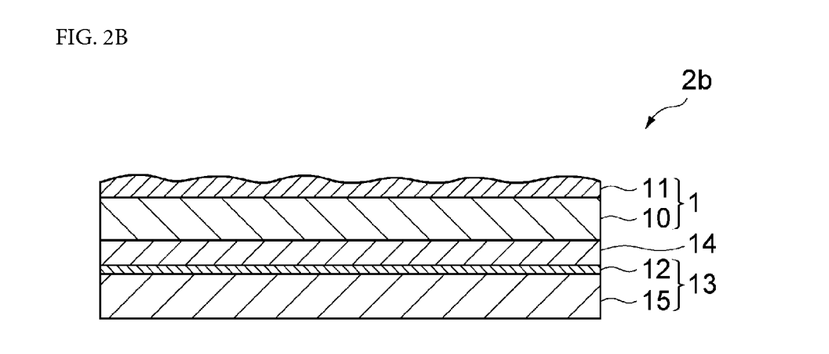
Figure 2C:
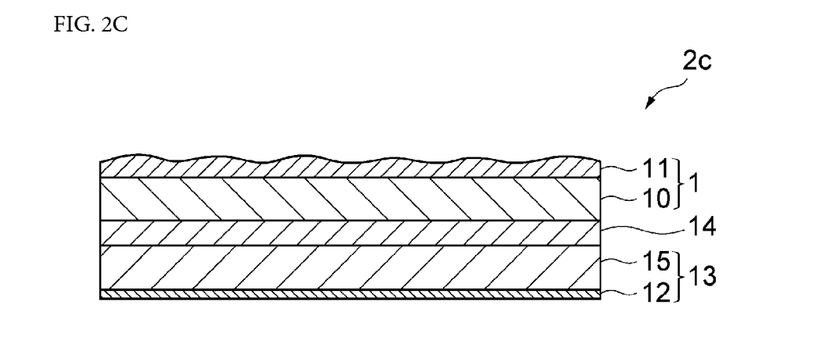

FIGS. 2A, 2B, and 2C are schematic sectional views of an optical barrier film related to an embodiment of the invention. The optical barrier film may take three forms as shown in FIGS. 2A, 2B, and 2C, respectively.

A first optical barrier film 2a of FIG. 2A includes a barrier layer 12 and the optical film 1. The first optical barrier film 2a has such a configuration that the optical film 1 is provided on the barrier layer 12, and the first surface 10A of the first transparent film substrate 10 is laminated to the barrier layer 12.

A second optical barrier film 2b of FIG. 2B includes a barrier composite layer 13, an adhesive layer 14 and the optical film 1. The barrier composite film 13 is made of a second transparent film substrate 15 and a barrier layer 12. With the second optical barrier film 2b, the barrier composite layer 13, the adhesive layer 14 and the optical film 1 are provided in this order, and the barrier layer 12 of the barrier composite layer 13 and the first transparent film substrate 10 of the optical film 1 are laminated with the adhesive layer 14.

A third optical barrier film 2c of FIG. 2C includes a barrier composite layer 13, an adhesive layer 14 and the optical film 1. With the third optical barrier film 2c, the barrier composite layer 13, the adhesive layer 14 and the optical film 1 are provided in this order, and a second transparent film substrate 1 of the barrier composite layer 13 and the first transparent film substrate 10 of the optical film 1 are laminated with the adhesive layer 14.

Figure 3A:
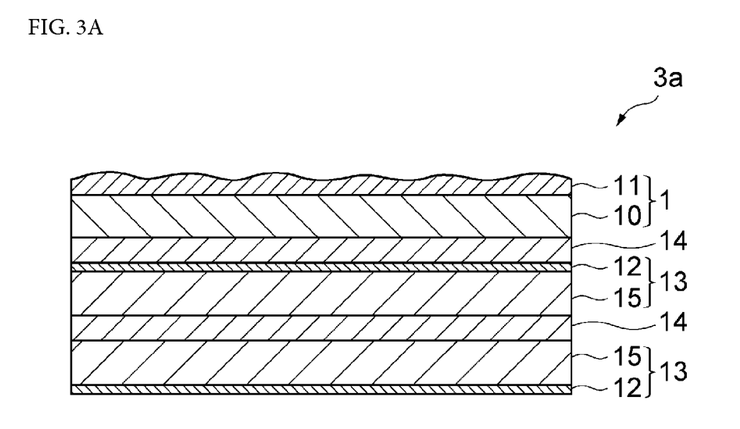
FIGS. 3A and 3B are schematic sectional views of another optical barrier film related to an embodiment of the invention.
Figure 3B:
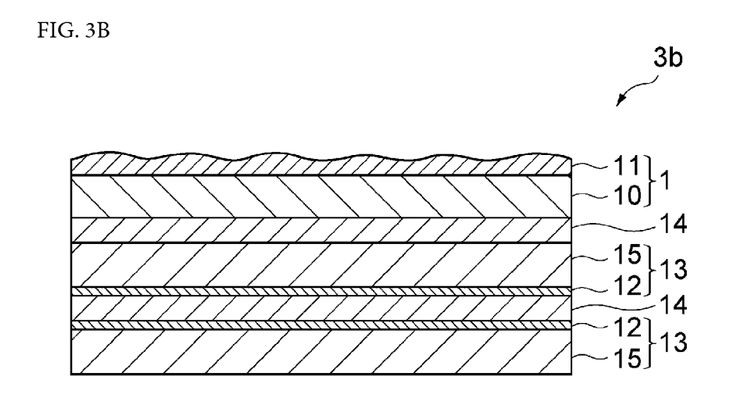

FIGS. 3A and 3B are schematic sectional views of another type of optical barrier film related to an embodiment of the invention. The optical barrier film can take two forms as shown in FIGS. 3A and 3B, respectively.

A fourth optical barrier film 3a of FIG. 3A includes two barrier composite layers 13, two adhesive layers 14 and the optical film 1. With the fourth optical barrier film 3a, one barrier composite layer 13, one adhesive layer 14, the other barrier composite layer 13 and the other adhesive layer 14 and the optical film 1 are provided in this order. A second transparent film substrate 15 of the one barrier composite layer 13 and a second transparent film substrate 15 of the other barrier composite layer 13 are laminated with the adhesive layer 14. A barrier layer 12 of the other barrier composite layer 13 and the first transparent film substrate 10 of the optical film 1 are laminated with the other adhesive layer 14.

A fifth optical barrier film 3b of FIG. 3B includes two barrier composite layers 13, two adhesive layers 14 and the optical film 1. With the fifth optical barrier film 3b, one barrier composite layer 13, one adhesive layer 14, the other barrier composite layer 13, the other adhesive layer 14, and the optical film 1 are provided in this order. A barrier layer 12 of the one barrier composite layer 13 and a barrier layer 12 of the other barrier composite layer 13 are laminated with the one adhesive layer 14. A second transparent film substrate 15 of the other barrier composite layer 13 and the first transparent film substrate 10 of the optical film 1 are laminated with the other adhesive layer 14.

The barrier layer 12 is made, for example, of a vacuum deposited thin film layer. The material for the barrier layer 12 can be, for example, a metal or a metal oxide. The metals for the barrier layer 12 include, for example, aluminum, copper and silver. The metal oxides for the barrier layer 12 can be, for example, at least one selected from yttrium tantalum oxide, aluminum oxide, silicon oxide and magnesium oxide. The metal oxide is preferably silicon oxide. The silicon oxide is inexpensive and excellent in barrier performance enough to block the infiltration of moisture and the like. The O/Si ratio between constituent oxygen and silicon of the silicon oxide is preferably at 1.0 to 2.0, inclusive, in terms of atomic ratio. If the O/Si ratio is less than 1.0 in terms of atomic ratio, the barrier performance lowers due to the lower cross-linkage. If the O/Si ratio is larger than 2.0 by atomic ratio, the barrier performance lowers. The barrier layer 12 made of a silicon oxide is prepared, for example, by a vacuum deposition method or a sputtering method.

The adhesive layer 14 can contain an adhesive or a pressure-sensitive adhesive made of an acrylic material or a polyester material. In order that the second optical barrier film 2b, the third optical barrier film 2c, the fourth optical barrier 3a and the fifth optical barrier film 3b are made small in thickness, the thickness of the adhesive layer 14 is preferably, for example, at not larger than 10 μm.

With the first optical barrier film 2a, the second optical barrier film 2b, the third optical barrier film 2c, the fourth optical barrier film 3a or the fifth optical barrier film 3b, the anti-blocking properties and improved scratch prevention are imparted by means of the matte layer 11, and the infiltration of air and moisture is appropriately reduced by means of the barrier layer 12 or the barrier composite layer 13. The barrier composite layer 13 is able to more decrease the numbers of scratches and defects and also to more reduce the infiltration of air and moisture when compared with the barrier layer 12.

(Color Conversion Film)

Figure 4:
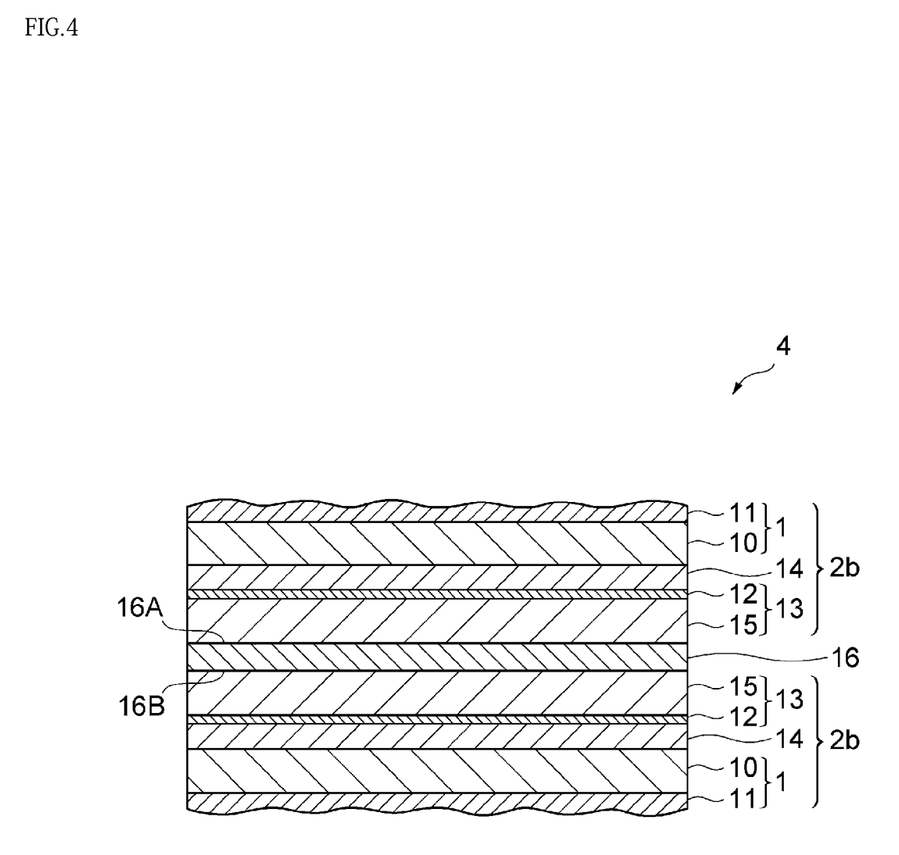
FIG. 4 is a schematic sectional view of a color conversion film related to an embodiment of the invention.

FIG. 4 is a schematic sectional view of a color conversion film related to an embodiment of the invention. In FIG. 4, a color conversion film 4 includes a color conversion layer 16 and two second optical barrier films 2b. The color conversion film 4 has such a configuration that the color conversion layer 16 is sandwiched between the two second optical barrier films 2b. The color conversion layer 16 has a third surface 16A and a fourth surface 16B at a side opposite to the third surface 16A, and the second optical barrier films 2b are, respectively, laminated to the third surface 16A and the fourth surface 16B of the color conversion layer 16.

The embodiment shown in FIG. 4 is an instance of the color conversion film 4. Besides, the first optical barrier films 2a of the same type may be laminated to the third surface 16A and the fourth surface 16B of the color conversion layer 16, respectively, or the third optical barrier films 2c of the same type may be laminated to the third surface 16A and the fourth surface 16B, respectively. Alternatively, the fourth optical barrier films 3a of the same type or the fifth optical barrier films 3b of the same type may be, for example, laminated to the third surface 16A and the fourth surface 16B of the color conversion layer 16, respectively.

Further, while any one of the first optical barrier film 2a, the second optical barrier film 2b, the third optical barrier film 2c, the fourth optical barrier film 3a and the fifth optical barrier film 3b is laminated to the third surface 16A of the color conversion layer 16, any one of the first optical barrier film 2a, the second optical barrier film 2b, the third optical barrier film 2c, the fourth optical barrier film 3a and the fifth optical barrier film 3b except the optical barrier film having laminated to the third surface 16A may be laminated to the fourth surface 16B. It is arbitrary how the first optical barrier film 2a, the second optical barrier film 2b, the third optical barrier film 2c, the fourth optical barrier film 3a and the fifth optical barrier film 3b are combined so as to be laminated to the third surface 16A and the fourth surface 16B of the color conversion layer 16, respectively.

The color conversion layer 16 converts a specified wavelength of light into another wavelength. The color conversion layer 16 is preferably made of core-shell light-emitting nanocrystals and a binder resin, for example. The core-shell light-emitting nanocrystals are prepared, for example, from a material containing an inorganic material. Preferably, the core-shell light-emitting nanocrystals are prepared, for example, from a material containing an inorganic conductor or a semiconductive material.

Examples of the semiconductive material include semiconductors of Groups II-VI, III-V, IV-VI and IV. More particularly, mention is made, for example, of one or an arbitrary combination of two or more of Si, Ge, Sn, Se, Te, B, C (including diamond), P, BN, BP, BAs. AlN, AlP, AlAs, AlSb, GaN, GaP, GaAs, GaSb, InN, InP, InAs, InSb, AlN, AlP, AlAs, AlSb, GaN, GaP, GaAs, GaSb, ZnO, ZnS, ZnSe, ZnTe, CdS, CdSe, CdTe, HgS, HgSe, HgTe, BeS, BeSe, BeTe, MgS, MgSe, GeS, GeSe, GeTe, SnS, SnSe, SnTe, PbO, PbS, PbSe, PbTe, CuF, CuCl, CuBr, CuI, $Si_3N_4$, $Ge_3N_4$, $Al_2O_3$, $(Al, Ga, In)_2(S, Se, Te)_3$ and $Al_2CO$.

The nanocrystals may contain, for example, a p- or n-type dopant. Further, the nanocrystals may contain, for example, a semiconductor of Group II-VI or III-V. The Group II-VI semiconductor nanocrystals include, for example, arbitrary combinations of Group II elements such as Zn, Cd and Hg and Group VI elements of S, Se, Te and Po. The Group III-V semiconductor nanocrystals include, for example, arbitrary combinations of Group III elements such as B, Al, Ga, In and Tl and Group V elements of N, P, As, Sb and Bi.

With the color conversion film 4, the matte layer 11 permits anti-blocking properties and improved scratch prevention to be developed, and the barrier composite layer 13 allows the infiltration of air and moisture to be appropriately reduced, thereby maintaining the color conversion performance of the color conversion film over a long period of time.

(Backlight Unit)

Figure 5:
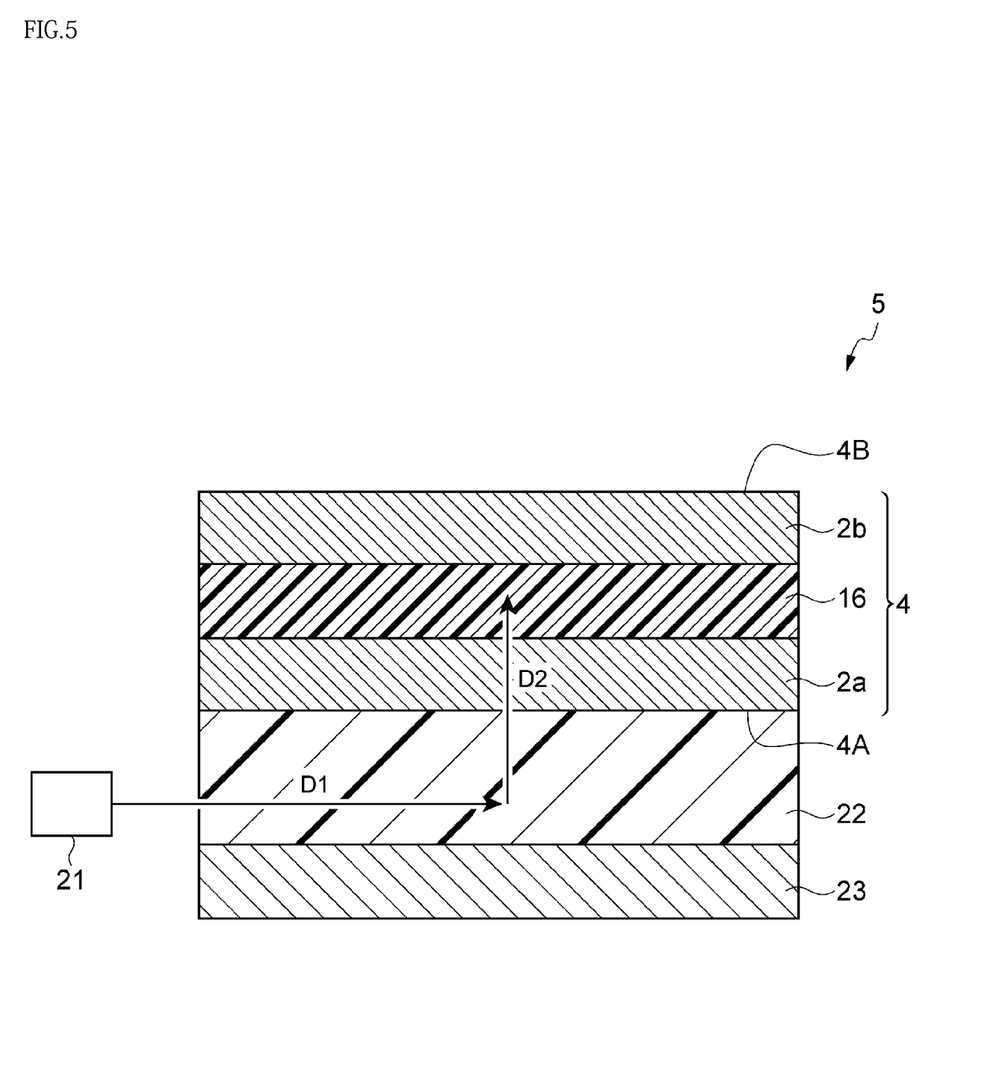
FIG. 5 is a schematic sectional view of a backlight unit related to an embodiment of the invention.

FIG. 5 is a schematic sectional view of a backlight unit related to an embodiment of the invention. In FIG. 5, a backlight unit 5 includes a light source 21, a light guiding plate 22, a color conversion film 4 arranged on the light guiding plate 22, and a reflector 23. The color conversion film 4 is arranged in such a way that an uneven surface 4A (or an uneven surface 4B) (i.e. the matte layer 11) is in contact with the light guiding plate 22. In more detail, the light guiding plate 22 and the reflector 23 are arranged on the uneven surface 4A of the color conversion film 4 in this order, and the light source 21 is arranged laterally (along the surface direction of the light guiding plate 22) of the light guiding plate 22. The backlight unit 5 is able to suppress the light guiding plate 22 in contact with the color conversion film 4 from being scratched. Since the barrier layer itself is suppressed from being scratched, the infiltration of air and moisture into the color conversion layer is appropriately reduced, so that good white light can be obtained from the backlight unit over a long time.

The light guiding plate 22 and the reflector 23 contribute to reflecting and guiding the light irradiated from the light source 21 in an efficient manner, and known materials are used therefor, respectively. As the light guiding plate 22, there are used, for example, acrylic, polycarbonate, and cycloolefin films. The materials used for the light guiding plate 22 do not have great hardness in most cases and tend to be scratched when contacting other members. Especially, although a polycarbonate is usually employed due to its high transparency and the ease in processing, it is likely to be scratched because of the low surface hardness thereof. For the light source 21, there are provided, for example, a plurality of blue light-emitting diode elements. This light-emitting diode element may be replaced by a purple light-emitting diode or a light-emitting diode of a lower wavelength. The light irradiated from the light source 21 falls on the light guiding plate 22 (in D1 direction), followed by falling on the color conversion layer 16 (in D2 direction) in association with reflection and refraction. The light transmitting through the color conversion layer 16 turns into white light by mixing yellow light or red light and green light generated in the color conversion layer 16 with the light prior to transmission through the color conversion layer 16.

EXAMPLES

The invention is further illustrated by way of examples of the invention and comparative examples, and the present invention should not be construed as limited to the following examples.

Example 1

A first transparent film substrate was prepared using a 25 μm thick polyethylene terephthalate film. Next, a matte layer composition was coated onto the first transparent film substrate and a coating film was formed by use of a wire bar coater. Subsequently, this coating film was subjected to thermal treatment at a temperature of 80° C. for 30 seconds to dry the coating film. The dried coating film was aged by allowing to stand at a temperature of 60° C. for 2 days to provide an optical film. The thickness of the matte layer was 3 μm.

The matte composition was prepared by mixing 100 parts by mass of a binder resin, 10 parts by mass of fine particles, 8.5 parts by mass of an isocyanate curing agent, 2 parts by mass of a quaternary ammonium salt material, and 70 parts by mass of a solvent. Acrydic A-814 (commercial name), manufactured by DIC Inc., was used as the binder resin, polypropylene having an average particle size of 3 μm was used as the fine particles, Burnock DN-980, manufactured by DIC Inc., was used as the isocyanate curing agent, and Light Ester DQ 100 (commercial name), manufactured by Kyoei Chemical Co., Ltd., was used as the quaternary ammonium salt material. The solvent used was ethyl acetate.

Example 2

In the same manner as in Example 1, an optical film was prepared. A matte composition was prepared according to the same procedure as in Example 1 using Acrydic A-814 (commercial name), manufactured by DIC Inc., as the binder resin, urethane-based fine particles having an average particle size of 2 μm as the fine particles, Burknock DN-980, manufactured by DIC Inc., as the isocyanate curing agent, and Light Ester DQ 100 (commercial name), manufactured by Kyoei Chemical Co., Ltd., as the quaternary ammonium salt material. Ethyl acetate was used as a solvent.

Example 3

In the same manner as in Example 1, an optical film was prepared. A matte composition was prepared according to the same procedure as in Example 1 using Acrydic A-814 (commercial name), manufactured by DIC Inc., as the binder resin, urethane-based fine particles having an average particle size of 6 μm as the fine particles, Burknock DN-980, manufactured by DIC Inc., as the isocyanate curing agent, and Light Ester DQ 100 (commercial name), manufactured by Kyoei Chemical Co., Ltd., as the quaternary ammonium salt material. Ethyl acetate was used as a solvent.

Example 4

In the same manner as in Example 1, an optical film was prepared. A matte composition was prepared according to the same procedure as in Example 1 using Acrydic A-814 (commercial name), manufactured by DIC Inc., as the binder resin, nylon fine particles having an average particle size of 6 μm as the fine particles, Burknock DN-980, manufactured by DIC Inc., as the isocyanate curing agent, and Light Ester DQ 100 (commercial name), manufactured by Kyoei Chemical Co., Ltd., as the quaternary ammonium salt material. Ethyl acetate was used as a solvent.

Example 5

In the same manner as in Example 1, an optical film was prepared. A matte composition was prepared according to the same procedure as in Example 1 using Acrydic A-814 (commercial name), manufactured by DIC Inc., as the binder resin, silicone fine particles having an average particle size of 8 μm as the fine particles, Burknock DN-980, manufactured by DIC Inc., as the isocyanate curing agent, and Light Ester DQ 100 (commercial name), manufactured by Kyoei Chemical Co., Ltd., as the quaternary ammonium salt material. Ethyl acetate was used as a solvent.

Example 6

In the same manner as in Example 1, an optical film was prepared. A matte composition was prepared according to the same procedure as in Example 1 using Acrydic A-814 (commercial name), manufactured by DIC Inc., as the binder resin, acrylic fine particles having an average particle size of 0.8 μm as the fine particles, Burknock DN-980, manufactured by DIC Inc., as the isocyanate curing agent, and Light Ester DQ 100 (commercial name), manufactured by Kyoei Chemical Co., Ltd., as the quaternary ammonium salt material. Ethyl acetate was used as a solvent.

Example 7

In the same manner as in Example 1, an optical film was prepared. A matte composition was prepared according to the same procedure as in Example 1 using Acrydic A-814 (commercial name), manufactured by DIC Inc., as the binder resin, acrylic urethane-based fine particles having an average particle size of 10 μm as the fine particles, Burknock DN-980, manufactured by DIC Inc., as the isocyanate curing agent, and Light Ester DQ 100 (commercial name), manufactured by Kyoei Chemical Co., Ltd., as the quaternary ammonium salt material. Ethyl acetate was used as a solvent.

Example 8

In the same manner as in Example 1, an optical film was prepared. A matte composition was prepared by mixing 100 parts by mass of a binder resin, 10 parts by mass of fine particles, 8.5 parts by mass of an isocyanate curing agent, 4 parts by mass of a lithium salt material, and 70 parts by mass of a solvent. Acrydic A-814 (commercial name), manufactured by DIC Inc., was used as the binder resin, urethane-based fine particles having an average particle size of 2 μm was used as the fine particles, PEL-25 (commercial name), manufactured by Japan Carlit Co., Ltd., was used as the quaternary ammonium salt material. The solvent used was ethyl acetate.

Comparative Example 1

In the same manner as in Example 1, an optical film was prepared. A matte composition was prepared according to the same procedure as in Example 1 using Acrydic A-814 (commercial name), manufactured by DIC Inc., as the binder resin, acrylic urethane-based fine particles having an average particle size of 15 μm as the fine particles, Burknock DN-980, manufactured by DIC Inc., as the isocyanate curing agent, and Light Ester DQ 100 (commercial name), manufactured by Kyoei Chemical Co., Ltd., as the quaternary ammonium salt material. Ethyl acetate was used as a solvent.

Comparative Example 2

In the same manner as in Example 1, an optical film was prepared. A matte composition was prepared according to the same procedure as in Example 1 using Acrydic A-814 (commercial name), manufactured by DIC Inc., as the binder resin, acrylic fine particles having an average particle size of 20 μm as the fine particles, Burknock DN-980, manufactured by DIC Inc., as the isocyanate curing agent, and Light Ester DQ 100 (commercial name), manufactured by Kyoei Chemical Co., Ltd., as the quaternary ammonium salt material. Ethyl acetate was used as a solvent.

Comparative Example 3

In the same manner as in Example 1, an optical film was prepared. A matte composition was prepared according to the same procedure as in Example 1 using Acrydic A-814 (commercial name), manufactured by DIC Inc., as the binder resin, urethane-based fine particles having an average particle size of 10 μm as the fine particles, Burknock DN-980, manufactured by DIC Inc., as the isocyanate curing agent, and Light Ester DQ 100 (commercial name), manufactured by Kyoei Chemical Co., Ltd., as the quaternary ammonium salt material. Ethyl acetate was used was a solvent.

Comparative Example 4

In the same manner as in Example 1, an optical film was prepared. A matte composition was prepared according to the same procedure as in Example 1 using Acrydic A-814 (commercial name), manufactured by DIC Inc., as the binder resin, urethane-based fine particles having an average particle size of 15 μm as the fine particles, Burknock DN-980, manufactured by DIC Inc., as the isocyanate curing agent, and Light Ester DQ 100 (commercial name), manufactured by Kyoei Chemical Co., Ltd., as the quaternary ammonium salt material. Ethyl acetate was used as a solvent.

Comparative Example 5

In the same manner as in Example 1, an optical film was prepared. A matte composition was prepared by mixing 100 parts by mass of a binder resin, 8.5 parts by mass of an isocyanate curing agent, 2 parts by mass of a quaternary ammonium salt material, and 70 parts by mass of a solvent. Acrydic A-814 (commercial name), manufactured by DIC Inc., was used as the binder resin, Burknock DN-980, manufactured by DIC Inc., was used as the isocyanate curing agent, and Light Ester DQ 100 (commercial name), manufactured by Kyoei Chemical Co., Ltd., was used as the quaternary ammonium salt material. The solvent used was ethyl acetate.

Comparative Example 6

In the same manner as in Example 1, an optical film was prepared. A matte composition was prepared by mixing 100 parts by mass of a binder resin, 8.5 parts by mass of an isocyanate curing agent, 10 parts by mass of fine particles, and 70 parts by mass of a solvent. Acrydic A-814 (commercial name), manufactured by DIC Inc., was used as the binder resin, acrylic urethane-based fine particles having an average particle size of 15 μm was used as the fine particles, and Burknock DN-980, manufactured by DIC Inc., was used as the isocyanate curing agent. The solvent used was ethyl acetate.

(Evaluation of Optical Film)

The results of the evaluation of the optical films related to the embodiments of the invention are shown in Table 1. In Table 1, there are shown the coefficient of static friction, the maximum height roughness Rz, the scratch proofness, the anti-blocking properties and the surface resistance value of the optical films obtained in the examples and the comparative examples.

<Coefficient of Static Friction>

With regard to the matte layers of the optical films obtained in the examples and comparative examples, the coefficient of static friction of the matte layer was measured by use of a tribometer. The tribometer used was Muze Type: 94i-II (commercial name), manufactured by Shinto Scientific Co., Ltd. This tribometer had a brass slider treated with hard chrome.

<Maximum Height Roughness Rz>

As to the optical films obtained in the examples and comparative examples, the maximum height roughness Rz defined in JIS B0601: 2013 by use of a non-contact/layer-cross section measuring system. As the non-contact/layer-cross section measuring system, R3300H Lite (commercial name), manufactured by Ryoka Systems Inc., was used, with which a surface profile within an area of 1 mm×1 mm of the matte layer of an optical film was measured.

<Scratch Prevention>

The matte layer of the respective optical films obtained in the examples and comparative examples and a polycarbonate film were placed in contact with each other, followed by allowing to stand under a load of 25 kgf/cm$^2$. Thereafter, the optical film and the polycarbonate film were each observed visually and through a microscope to evaluate their scratch prevention properties. The polycarbonate film was provided as an imitation of the light guiding plate of a backlight unit. The polycarbonate film had a thickness of 188 μm. The results of observation that no scratch was recognized in the matte layer of the optical film and the polycarbonate film were evaluated as "A", the results of observation that scratches were found were evaluated as "B", and the results of observation that scratches were considerably found were evaluated as "C".

<Anti-Blocking Properties>

The matte layer of the respective optical films obtained in the examples and comparative examples and a polycarbonate film were placed in contact with each other, followed by allowing to stand under a load of 50 kgf/cm$^2$. Thereafter, the optical film and the polycarbonate film were each observed visually and through a microscope to evaluate their scratch prevention. The polycarbonate film was provided as an imitation of the light guiding plate of a backlight unit. The thickness of the polycarbonate film was 188 μm. The results of observation that no blocking was found were evaluated as "A", the results of the observation that blocking was recognized were evaluated as "B", and the results of observation that blocking was considerably found were evaluated as "C".

<Surface Resistance Value>

With regard to the surface of the matte layer of the respective optical films obtained in the examples and comparative examples, its surface resistance was measured in conformity with JIS K6911. The high resistance resistivity meter used was Hiresta MCP-HT260 (commercial name), manufactured by Dia Instruments Co., Ltd.

TABLE 1

|  | Coefficient of static friction | Maximum height roughness Rz (μm) | Scratch prevention Properties | Anti-blocking properties | Surface resistance value (Ω/□) |
|---|---|---|---|---|---|
| Example 1 | 0.14 | 1.5 | A | A | $4.3 \times 10^{10}$ |
| Example 2 | 0.19 | 1.3 | A | A | $8.3 \times 10^{10}$ |
| Example 3 | 0.27 | 2.4 | A | A | $2.1 \times 10^{10}$ |
| Example 4 | 0.16 | 2.7 | A | A | $2.2 \times 10^{10}$ |
| Example 5 | 0.16 | 4.3 | A | A | $4.1 \times 10^{10}$ |
| Example 6 | 0.22 | 0.08 | A | A | $1.8 \times 10^{10}$ |
| Example 7 | 0.28 | 6.8 | A | A | $4.4 \times 10^{10}$ |
| Example 8 | 0.21 | 1.4 | A | A | $6.5 \times 10^{10}$ |
| Comparative Example 1 | 0.28 | 8.3 | C | A | $5.6 \times 10^{10}$ |
| Comparative Example 2 | 0.31 | 9.5 | C | A | $6.2 \times 10^{10}$ |
| Comparative Example 3 | 0.41 | 4.2 | B | A | $6.9 \times 10^{10}$ |
| Comparative Example 4 | 0.45 | 6.3 | C | A | $2.2 \times 10^{10}$ |
| Comparative Example 5 | 0.49 | 0.03 | A | C | $3.7 \times 10^{10}$ |
| Comparative Example 6 | 0.25 | 8.8 | C | A | $>1.0 \times 10^{14}$ |

When compared with Comparative Examples 1 to 6, the results of Examples 1 to 8 reveal that when the coefficients of static friction of the matte layers are not larger than 0.3 and the maximum height roughness Rz defined in JIS B0601:2013 are from 0.05 μm to 8 μm, there can be obtained optical films having good scratch prevention in addition to anti-blocking properties. Such an optical film can be favorably used for an optical barrier film and a color conversion film.

INDUSTRIAL APPLICABILITY

According to the present invention, there can be provided an optical film having a matte layer, which not only is able to prevent the blocking with other member that is facing the matte layer, but also is less likely to scratch the matte layer and other member facing therewith. Moreover, according to the invention, there are also provided an optical barrier film, and a color conversion film and a backlight unit, each containing the optical film and excellent in barrier properties.

REFERENCE SIGNS LIST

1 . . . optical film, 2a . . . first optical barrier film, 2b . . . second optical barrier film, 2c . . . third optical barrier film, 3a . . . fourth optical barrier film, 3b . . . fifth optical barrier film, 4 . . . color conversion film, 5 . . . backlight unit, 10 . . . first transparent film substrate, 10A . . . first surface, 10B . . . second surface, 11 . . . matte layer, 11A . . . uneven surface, 11B . . . undersurface, 12 . . . barrier layer, 13 . . . barrier composite layer, 14 . . . adhesive layer, 15 . . . second transparent film substrate, 16 . . . color conversion layer, 16A . . . third surface, 16B . . . fourth surface, 21 . . . light source, 22 . . . light guiding plate

What is claimed is:

1. A color conversion film comprising:
   a color conversion layer;
   a barrier composite layer provided on the color conversion layer, said barrier composite layer having a second transparent film substrate and a barrier layer reducing infiltration of air and moisture to the color conversion layer;
   an optical film comprising a first transparent film substrate; and,
   a matte layer arranged on the first transparent film substrate and having irregularities,
   wherein an outer surface of the matte layer, which is a surface of the matte layer opposite to a surface of the matte layer facing the first transparent film, has a coefficient of static friction of not larger than 0.3 and a maximum height roughness Rz of not less than 0.05 μm to not larger than 8 μm,
   wherein the barrier composite layer is arranged and adhered to with an adhesive layer on a surface opposite to the matte layer side of the first transparent film substrate of the optical film,
   wherein the matte layer contains a binder resin and fine particles, wherein the fine particles have an average particle size of not less than 0.5 μm to not larger than 10 μm; and
   wherein the outer surface of the matte layer is an outermost surface of the color conversion film.

2. The color conversion film of claim 1, wherein the matte layer further contains a quaternary ammonium salt material.

3. The color conversion film of claim 1, wherein the matte layer has a surface resistance value of not larger than $1.0 \times 10^{13} \Omega/\square$.

4. The color conversion of claim 1, wherein the barrier layer of the barrier composite layer is arranged on the optical film side.

5. The color conversion of claim 1, wherein the barrier layer of the barrier composite layer is arranged on a side opposite from the optical film.

6. The color conversion of claim 1, wherein the barrier layer contains a silicon oxide represented by $SiO_x$ (wherein $1.0 \leq x \leq 2.0$).

7. A backlight unit comprising a light source, a light guiding plate, and the color conversion film of claim 1, wherein the color conversion film is so arranged that the matte layer is in contact with the light guiding plate.

8. The color conversion film of claim 1, wherein the barrier layer is a vacuum deposited thin film layer.

9. The color conversion film of claim 6, wherein the barrier layer is prepared, by a vacuum deposition method or a sputtering method.

10. The color conversion film of claim 1, wherein the binder resin is a transparent resin.

11. The color conversion film of claim 10, wherein the resin is an acrylic resin.

12. The color conversion film of claim 1, wherein an amount of the fine particles is no less than 5 mass % to no larger than 50 mass % based on a total solid content of the matte layer.

13. The color conversion film of claim 1, wherein the color conversion layer comprises core-shell light-emitting nanocrystals.

14. The color conversion film of claim 1, wherein the average particle size of not less than 0.8 μm to not larger than 10 μm.

* * * * *